(12) United States Patent
Chommeloux et al.

(10) Patent No.: US 9,027,407 B2
(45) Date of Patent: May 12, 2015

(54) LOW-COST TEMPERATURE AND PRESSURE SENSOR COMPRISING SAW RESONATORS, AND METHOD OF FABRICATION FOR SAME

(75) Inventors: Luc Chommeloux, Le Cannet (FR); Philippe Menage, Vence (FR)

(73) Assignee: Senseor, Mougins (FR)

( * ) Notice: Subject to any disclaimer, the term of this patent is extended or adjusted under 35 U.S.C. 154(b) by 258 days.

(21) Appl. No.: 13/825,312

(22) PCT Filed: Sep. 19, 2011

(86) PCT No.: PCT/EP2011/066217
§ 371 (c)(1),
(2), (4) Date: Apr. 16, 2013

(87) PCT Pub. No.: WO2012/038375
PCT Pub. Date: Mar. 29, 2012

(65) Prior Publication Data
US 2013/0205906 A1 Aug. 15, 2013

(30) Foreign Application Priority Data

Sep. 22, 2010 (FR) ..................... 10 57594

(51) Int. Cl.
| G01L 7/00 | (2006.01) |
| G01L 11/00 | (2006.01) |
| G01L 9/08 | (2006.01) |
| G01L 9/00 | (2006.01) |
| G01L 19/00 | (2006.01) |
| G01K 11/26 | (2006.01) |
| G01L 3/10 | (2006.01) |
| G01L 1/16 | (2006.01) |

(52) U.S. Cl.
CPC ... G01L 9/08 (2013.01); G01L 3/10 (2013.01); G01L 1/165 (2013.01); G01L 9/0025 (2013.01); G01L 9/008 (2013.01); G01L 19/0092 (2013.01); G01K 11/265 (2013.01)

(58) Field of Classification Search
CPC ... G01L 9/0025; G01L 9/008; G01L 19/0092; G01L 3/10; G01L 1/165
USPC ................... 73/703, 716, 801, 715, 700, 702; 310/313 R
See application file for complete search history.

(56) References Cited

U.S. PATENT DOCUMENTS

| 6,907,787 B2 * | 6/2005 | Cook et al. ...................... 73/700 |
| 7,000,298 B2 * | 2/2006 | Cook et al. ................... 29/25.41 |
| 7,165,455 B2 * | 1/2007 | Magee et al. .................... 73/650 |
| 7,841,241 B2 * | 11/2010 | Leigh et al. ...................... 73/754 |
| 2004/0216526 A1 | 11/2004 | Cook et al. |
| 2005/0231067 A1 | 10/2005 | Cook et al. |
| 2006/0130585 A1 | 6/2006 | Magee et al. |
| 2009/0100935 A1 | 4/2009 | Leigh et al. |

* cited by examiner

*Primary Examiner* — Lisa Caputo
*Assistant Examiner* — Jonathan Dunlap
(74) *Attorney, Agent, or Firm* — Baker Hostetler LLP

(57) ABSTRACT

A pressure and temperature sensor comprising comprises at least a first resonator of the SAW type comprising a piezoelectric substrate, thinned at least locally, of the membrane type, a second resonator of the SAW type comprising a piezoelectric substrate and a third resonator of the SAW type comprising a piezoelectric substrate, characterized in that the first, the second and the third resonators are respectively on the surface of first, second and third individual piezoelectric substrates, each of the individual substrates being positioned on the surface of a common base section, locally machined away under said first resonator in such a manner as to liberate the substrate from said resonator so as to render it operational for the measurement of pressure. A method of fabrication for such a sensor is also provided.

14 Claims, 2 Drawing Sheets

US 9,027,407 B2

LOW-COST TEMPERATURE AND PRESSURE SENSOR COMPRISING SAW RESONATORS, AND METHOD OF FABRICATION FOR SAME

CROSS-REFERENCE TO RELATED APPLICATIONS

This application is a National Stage of International patent application PCT/EP2011/066217, filed on Sep. 19, 2011, which claims priority to foreign French patent application No. FR 1057594, filed on Sep. 22, 2010, the disclosures of which are incorporated by reference in their entirety.

FIELD OF THE INVENTION

The field of the invention is that of remotely interrogatable passive sensors, notably stress sensors, and in particular pressure and temperature sensors using surface acoustic wave resonators, commonly known as SAW resonators.

BACKGROUND

The principle of interrogation of a SAW sensor based on a resonator is illustrated in FIG. 1.

The complete system is composed of an interrogation unit (itself composed of a transmitter part and of a receiver part) and of the SAW pressure sensor. The interrogation system together with the SAW sensor have an antenna adapted to the operating frequency band (ISM band 433 MHz, 868 MHz, 2.45 GHz, etc.) which enables wireless interrogation of the sensor to be effected.

The mode of interrogation is as follows:

The transmitter of the interrogation system 1 sends an interrogation signal to the SAW sensor at a frequency close to the resonance frequency of the sensor corresponding to the step represented schematically by the block B1:

- the electromagnetic signal received by the antenna of the sensor is converted into a surface wave via an interdigitated comb structure which is charged up owing to the piezoelectric properties of the substrate used (quartz for example) corresponding to the resonator of the SAW type, step illustrated by the block B2, and this surface wave sees its properties modified as a function of the pressure and/or of the temperature which affect the conditions of propagation (in particular speed, which will affect the resonance frequency);
- the sensor re-transmits an echo at its intrinsic resonance frequency which carries the information linked to the phenomenon that it is desired to identify: variation of temperature and/or of pressure, step B3;
- outside of the time period for transmission, the receiver of the interrogation system 1 detects all or part of the echo from the SAW sensor and extracts from the response received the information sought that can relate to the temperature and/or the pressure, step B4.

Generally speaking, the interdigitated comb structure may be incorporated between reflectors, creating a resonant cavity characterized by a certain resonance frequency. This frequency depends primarily on the speed of propagation of the waves under the array which itself mainly depends on the physical state of the substrate. It is therefore sensitive to the effects of stresses applied to the substrate. It is therefore from the resulting variation in frequency measured by the interrogation system that the state of stress in particular can be evaluated.

In the case of a stress measurement, for example an effect of hydrostatic pressure, a differential measurement may be effected. If two resonators designed to be compensated for the quasi-static thermal effects at the operating temperature of the sensor are used, of which only one of the two is subjected to the effects of stress, then the difference in frequency between the two resonators is representative only of the effects of stress. Such a measurement is thus referred to as a referenced measurement.

In the case of a pressure sensor using a reference, at least one of the resonators is sensitive to the pressure applied. This can be achieved by for example localizing the resonator on a thinned part of the piezoelectric substrate. Its frequency variation is linear as a function of the pressure (within the linear deformation limit):

$$f(P) = f(P_0) + Sp \times P$$

Sp (expressed in KHz per MPa for example) being denoted the sensitivity to pressure. The latter depends on the geometry of the aperture and on the properties of the piezoelectric substrate. P denotes the over-pressure (or under-pressure) with respect to the reference pressure $P_0$.

According to the prior art, a pressure and temperature sensor can advantageously be based on a differential structure using three SAW resonators.

A first resonator, referred to as pressure resonator, uses the axis of propagation X, as does a second resonator RSAW, but is positioned in a thinned region in such a manner that when an over-pressure or an under-pressure (with respect to the pressure of the cavity) is exerted on the lower face of the device, the frequency of said first resonator varies proportionally. Said first resonator uses the same direction of propagation as the second resonator (same dependency of the frequency as a function of the temperature). The difference in frequency between the first and second resonators consequently allows information linked only to the pressure exerted on the lower face of the device to be obtained irrespective of the temperature.

The second resonator using the normal axis of propagation X is situated in a region exempt of stresses. A third resonator, also located in a region with no stresses, is inclined at a certain angle, typically 20°, with respect to the axis X. Inclining said third resonator gives the latter a different sensitivity versus temperature. The difference in frequency between the second and third resonators consequently allows information linked only to the temperature to be obtained irrespective of the state of the pressure exerted on the lower face of the device.

Using a differential structure offers the advantage of reducing the non-linearity of the sensor given that the residual non-linearities are corrected by the calibration of the sensor. Another advantage of the differential structure resides in the fact that a large part of the effects of aging may be overcome.

One exemplary embodiment of a SAW sensor for measuring pressure and temperature according to the state of the art is furthermore illustrated in FIG. 2. According to this configuration, the sensor of the quartz chip type (AQP for "All Quartz Package") is composed of a base section 10 containing the SAW resonators: $R_1$, $R_2$ and $R_3$ and of a cap 20 made of quartz rigidly attached to the base section via a fillet of glass paste. The base section is furthermore bonded onto a printed circuit 30 compatible with the temperatures of use, the whole assembly being enclosed by a protection cover 40 made of a plastic material.

The chip thus comprises the three resonators $R_1$, $R_2$ and $R_3$. The resonator $R_1$ is located on a thinned region (a membrane obtained by a process of mechanical machining for example) and its resonance frequency consequently depends on the external pressure and on the temperature. The external pressure is transmitted via an incompressible silicone gel 60 (for example) which fills the aperture.

The resonator $R_2$ has a structure very close to that of the resonator $R_1$ but is positioned in a region where the stresses associated with the pressure are negligible (non-thinned region). The resonator $R_2$ in particular exhibits the same sensitivity to temperature as the resonator $R_1$. The difference in frequency between the resonators $R_1$ and $R_2$ consequently supplies information which principally depends on the pressure.

The resonator $R_3$ is also positioned in a region where the stresses associated with the pressure are negligible. The latter is inclined with respect to the resonators $R_1$ and $R_2$. This orientation endows it with a different sensitivity to temperature, in particular, with respect to the resonator $R_2$. The difference in frequency between the resonators $R_2$ and $R_3$ consequently supplies information which depends only on the temperature.

This type of structure nevertheless has some drawbacks:
 the latter requires an individual calibration of the sensors in pressure and in temperature owing to the technological dispersions in the processes of fabrication of the resonators and of machining of the quartz substrate in order to form the membrane;
 the insensitivity to stresses associated with the pressure of the gas or of the fluid of the resonators $R_2$ and $R_3$ greatly depends on the assembly tolerances in particular on the bonding of the AQP chip;
 the cost of the AQP chips is high owing to the complexity of the fabrication process. The latter indeed requires a first phase for machining away the capping wafers (which, thus rendered fragile, generate yield problems), a phase for deposition of glass paste on the capping wafers and a glass sealing process.

SUMMARY OF THE INVENTION

It is for this reason that, in this context, the aim of the present invention is a novel architecture comprising a package with a ceramic base section similar in every respect to the technology of the standard packages used in the microelectronics industry.

More precisely, one subject of the present invention is a pressure and temperature sensor comprising at least a first resonator of the SAW type comprising a piezoelectric substrate, thinned at least locally, of the membrane type, a second resonator of the SAW type comprising a piezoelectric substrate and a third resonator of the SAW type comprising a piezoelectric substrate, characterized in that the first, the second and the third resonators are respectively on the surface of first, second and third individual piezoelectric substrates, each of the individual substrates being positioned on the surface of a common base section, locally machined away under the first resonator in such a manner as to liberate the substrate from said resonator so as to render it operational for the measurement of pressure.

According to one variant of the invention, the first, second and third individual substrates are made of quartz.

According to one variant of the invention, the first and second individual substrates have a first quartz cut-away section, the third individual substrate having a second quartz cut-away section.

According to one variant of the invention, the sensor comprises a cap over the surface of said base section, common to the three resonators.

According to one variant of the invention, the cap is made of metal.

According to one variant of the invention, the resonators are formed on a ceramic base section. Advantageously, this ceramic base section is a substrate of the HTCC, for "High Temperature Co-fired Ceramic", type.

According to one variant of the invention, the cap and the base section are in direct contact.

According to one variant of the invention, the three substrates are rigidly attached to said base section by the same adhesive.

According to one variant of the invention, the first substrate is rigidly attached to the base section with a first adhesive, the second and third substrates being rigidly attached to the base section with a second adhesive.

Another subject of the invention is a method of fabrication for a sensor according to the invention, characterized in that it comprises the following steps:
 the fabrication of a first, of a second and of a third resonator respectively comprising a first, a second and a third individual piezoelectric substrate, the first resonator furthermore comprising at least one thinned part of substrate, so as to define three individual chips;
 the assembly of said individual chips on the surface of a common base section;
 the local machining away of said base section in such a manner as to liberate the first substrate and to render it operational for variations in pressure.

According to one variant of the invention, the method comprises a step for thinning the first substrate carried out by a micro-machining process, after assembly of the three individual chips on said base section.

According to one variant of the invention, the method comprises a step for thinning said first substrate prior to assembly of said chips on said base section.

According to one variant of the invention, the method furthermore comprises a step for fixing the cap onto said base section.

According to one variant of the invention, the chips are rigidly attached to the base section with an adhesive.

According to one variant of the invention, the chips are rigidly attached to the base section with a glass paste.

BRIEF DESCRIPTION OF THE DRAWINGS

The invention will be better understood and other advantages will become apparent from reading the description that follows presented by way of non-limiting example and with reference to the appended figures amongst which.

DETAILED DESCRIPTION

Figure 3:
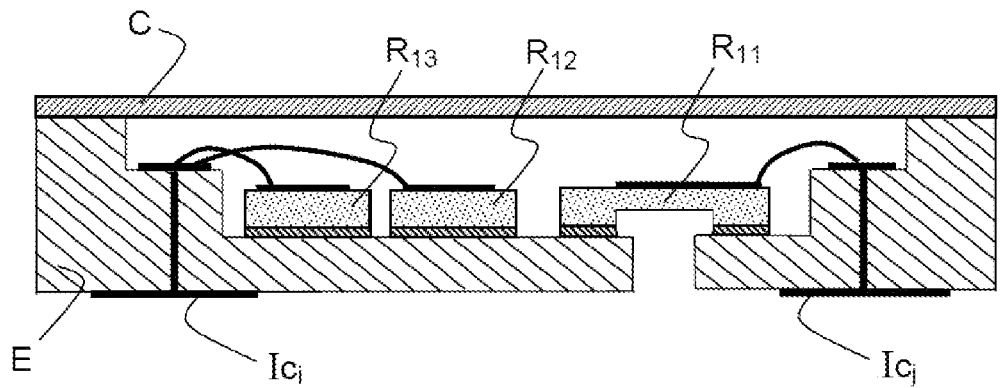
FIG. 3 illustrates a first example of pressure and temperature sensor according to the present invention.

According to the present invention, the pressure and temperature sensor comprises three separate chips as illustrated in FIG. 3. More precisely, each of the chips comprises an individual piezoelectric substrate on the surface of which sets of electrodes are formed in such a manner as to define three resonators $R_{11}$, $R_{12}$ and $R_{13}$, these three chips being rigidly fixed onto a common base section E in which interconnection circuits $I_{Ci}$ and $I_{Cj}$ are formed so as to be able to connect all of said resonators. The base section is locally machined away in such a manner as to liberate the substrate from the resonator $R_{11}$ dedicated to pressure measurements and to render it operational for pressure measurements as previously described, said resonator $R_{11}$ having a piezoelectric membrane sensitive to the pressure variations in a given environment. The whole assembly is hermetically sealed thanks to the employment of a cap C fixed onto said base section (also thanks to the mode of the chip R11) and thus allowing all of the resonators to be encapsulated.

Advantageously the base section can be of "HTCC"—for "High Temperature Cofired Ceramic"—type corresponding to a ceramic support composed of dielectric plates made of ceramic, with prior formation of conducting patterns, resistors, capacitors, and of metalized vias for the connections between the plates.

Such a configuration offers a certain number of advantages:

- having three separate chips allows the matching procedures to be applied that are necessary in order to obtain a sensor without calibration;
- being able to use a different quartz cut-away section for the resonator $R_{13}$ with respect to the resonators $R_{11}$ and $R_{12}$ allows design difficulties for the resonator $R_{13}$ to be overcome since the latter can use the normal axis of propagation X. The dispersion in frequency linked to the fabrication tolerances is moreover reduced which may ultimately allow the precision of the sensor to be increased;
- the separation of the three chips also allows an improvement in the mechanical isolation to be obtained between the region with stresses corresponding to the region in which the resonator $R_{11}$ is situated and the region with minimal stresses in which the resonators $R_{12}$ and $R_{13}$ are positioned.

Advantageously, the same adhesive is used for the three resonators in order to attain an optimum compensation for the stresses generated by the difference in coefficient of thermal expansion CTE between the ceramic base section, the adhesive and the SAW chips. The adhesive used must also allow the hermetic sealing of the sensor to be guaranteed via the bonding of the chip with respect to the resonator $R_{11}$.

Figure 1:
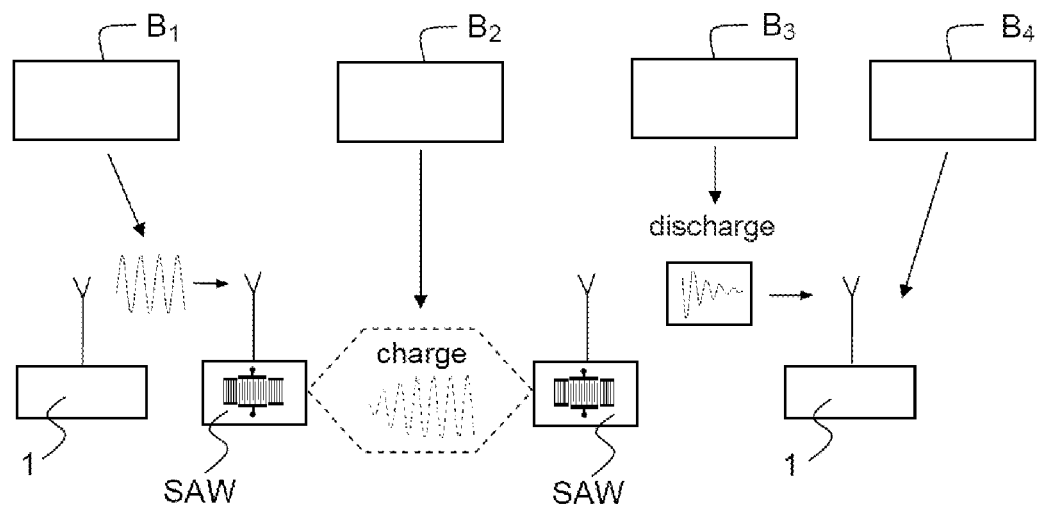
FIG. 1 illustrates the principle of wireless interrogation of a SAW sensor composed of a resonator according to the prior art.
Figure 2:
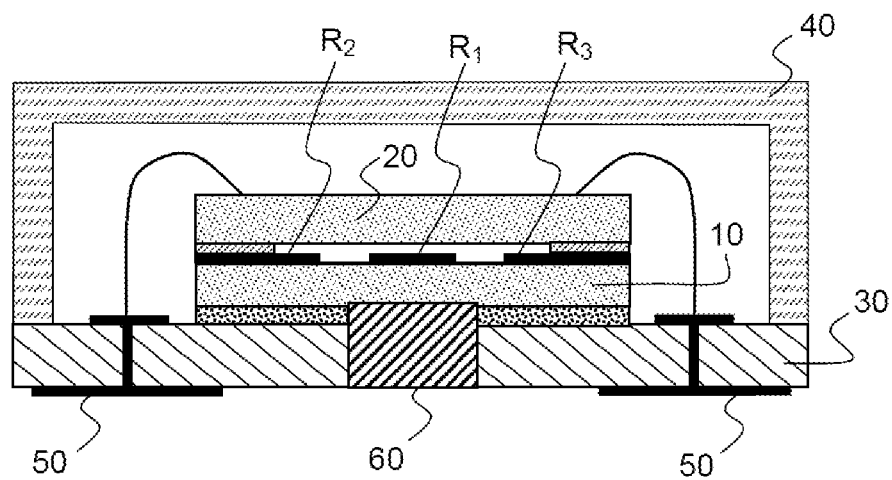
FIG. 2 illustrates an example of pressure and temperature sensor using three resonators of the SAW type according to the prior art.

Furthermore, the cost of fabrication of such a sensor is greatly reduced with respect to the sensor configuration according to the prior art illustrated in FIG. 2 owing to the fact that all the operations for machining the caps, for deposition of glass paste, and for glass sealing are eliminated. Aside from the saving in materials (capping wafer), the electrical test after glass sealing is no longer required. No longer using glass sealing also allows the size of the chips to be reduced and de facto the cost of fabrication of the latter to be reduced (increase in the number of devices per wafer).

It should also be noted that the use of a ceramic package (HTCC standard type) with a metal cap (closed by electrical welding in order to be compatible with high temperatures of use) also allows the price of the component to be significantly reduced down to a range compatible with high volume markets, while at the same time conserving the possibility of having a vacuum encapsulation conducive to the maximization of the over-voltage on the resonators (impact on the system link loss and, as a consequence, on the interrogation distance).

Figure 4:
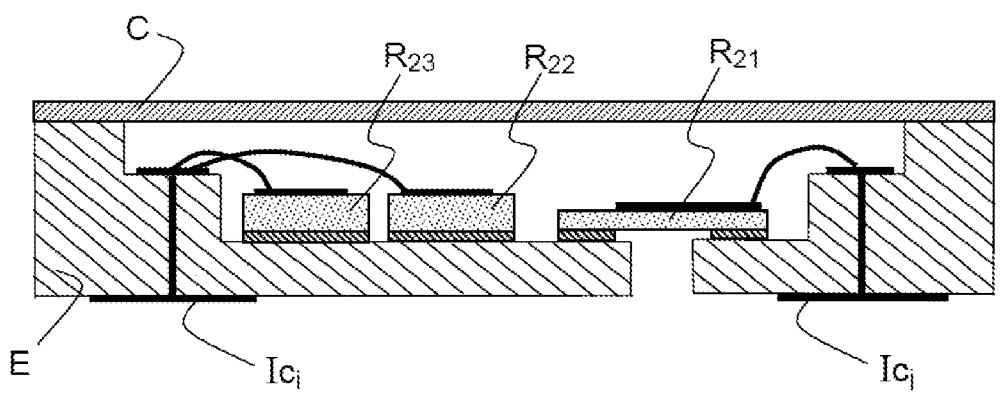
FIG. 4 illustrates a second example of pressure and temperature sensor according to the present invention.

One variant of the invention, shown in FIG. 4, illustrates a second example of a sensor according to the invention.

A step for thinning the piezoelectric substrate is carried out before or after dicing of the chip comprising the resonator $R_{21}$ and the latter is mounted with the same process as that described previously.

FIG. 4 highlights the three resonators $R_{21}$, $R_{22}$ and $R_{23}$. This solution has the advantage of no longer needing to employ a local micro-machining process which can be costly.

The invention claimed is:

1. A pressure and temperature sensor, comprising: at least one first resonator of the SAW type comprising a piezoelectric substrate, thinned at least locally, of the membrane type, a second resonator of the SAW type comprising a piezoelectric substrate and a third resonator of the SAW type comprising a piezoelectric substrate, the first, the second and the third resonators are respectively on the surface of first, second and third individual piezoelectric substrates, each of the individual substrates being positioned on the surface of a common base section, locally machined away under one of said at least one first resonator in such a manner as to liberate the substrate from said resonator so as to render it operational for the measurement of pressure.

2. The pressure and temperature sensor as claimed in claim 1, wherein the first, second and third individual substrates are made of quartz.

3. The pressure and temperature sensor as claimed in claim 2, wherein the first and second individual substrates have a first quartz cut-away section, the third individual substrate having a second quartz cut-away section.

4. The pressure and temperature sensor as claimed in claim 1, further comprising a cap over the surface of said base section, common to the three resonators.

5. The pressure and temperature sensor as claimed in claim 4, wherein the cap and the base section are in direct contact.

6. The pressure and temperature sensor as claimed in claim 1, further comprising a metal cap.

7. The pressure and temperature sensor as claimed in claim 1, wherein the resonators are formed on a ceramic base section.

8. The pressure and temperature sensor as claimed in claim 1, wherein the three substrates are rigidly attached to said base section by the same adhesive.

9. The pressure and temperature sensor as claimed in claim 1, wherein the first substrate is rigidly attached to the base section with a first adhesive, the second and third substrates being rigidly attached to the base section with a second adhesive.

10. A method for fabricating a sensor as claimed in claim 1, further comprising:

- fabrication of a first, of a second and of a third resonator respectively comprising a first, a second and a third individual piezoelectric substrate, the first resonator furthermore comprising at least one thinned part of substrate, so as to define three individual chips;
- assembly of said individual chips on the surface of a common base section;
- local machining away of said base section in such a manner as to liberate the first substrate ($R_{11}$) and to render it operational for variations in pressure.

11. The method for fabricating a sensor as claimed in claim 10, further comprising thinning the first substrate carried out by a micro-machining process, after assembly of the three individual chips on said base section.

12. The method of fabrication as claimed in claim 11, further comprising thinning said first substrate prior to assembly of said chips on said base section.

13. The method of fabrication as claimed in claim 11, further comprising fixing the cap onto said base section.

14. The method of fabrication as claimed in claim 11, wherein the chips are rigidly attached to the base section with an adhesive.

* * * * *